United States Patent
Fuxa et al.

(10) Patent No.: US 10,254,814 B2
(45) Date of Patent: Apr. 9, 2019

(54) STORAGE SYSTEM BANDWIDTH DETERMINATION

(71) Applicant: HEWLETT PACKARD ENTERPRISE DEVELOPMENT LP, Houston, TX (US)

(72) Inventors: James Alexander Fuxa, Houston, TX (US); Michelle Geppert, Houston, TX (US); Yovita Iskandar, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 157 days.

(21) Appl. No.: 15/327,451

(22) PCT Filed: Sep. 4, 2014

(86) PCT No.: PCT/US2014/054110
§ 371 (c)(1),
(2) Date: Jan. 19, 2017

(87) PCT Pub. No.: WO2016/036374
PCT Pub. Date: Mar. 10, 2016

(65) Prior Publication Data
US 2017/0160784 A1    Jun. 8, 2017

(51) Int. Cl.
*G06F 1/32* (2006.01)
*G06F 1/324* (2019.01)
(Continued)

(52) U.S. Cl.
CPC ............ *G06F 1/324* (2013.01); *G06F 1/3221* (2013.01); *G06F 1/3268* (2013.01);
(Continued)

(58) Field of Classification Search
None
See application file for complete search history.

(56) References Cited

U.S. PATENT DOCUMENTS

| 5,781,768 A * | 7/1998 | Jones, Jr. ................. G06F 1/08 713/501 |
| 7,447,824 B2 | 11/2008 | Jabori et al. |

(Continued)

FOREIGN PATENT DOCUMENTS

| WO | WO-2015167490 | 11/2015 |
| WO | WO-2016036374 A1 | 3/2016 |

OTHER PUBLICATIONS

Bellosa, F., "Process Cruise Control: Throttling Memory Access in a Soft Real-time Environment," (Research Paper), Jul. 1997, 16 pages, available at http://os.itec.kit.edu/english/21_991.php.

(Continued)

*Primary Examiner* — Paul Yen
(74) *Attorney, Agent, or Firm* — International IP Law Group, PLLC

(57) ABSTRACT

Techniques for reducing power consumption of a storage controller are provided. An example method includes determining a back-end bandwidth of a storage system, wherein the back-end of the storage system includes a storage drive communicatively coupled to a storage controller. The method also includes determining a front-end bandwidth of the storage system, wherein the front-end of the storage system includes a front-end bus coupling the storage controller to a host. The method also includes computing a target back-end memory bandwidth based on the back-end bandwidth and computing a target front-end memory bandwidth based on the front-end bandwidth. The method also includes reducing power consumption of the storage controller by reducing a clock frequency of a memory device of the storage controller based on the greater of the target back-end memory bandwidth and the target front-end memory bandwidth.

20 Claims, 6 Drawing Sheets

(51) Int. Cl.
  *G06F 12/0873* (2016.01)
  *G06F 11/10* (2006.01)
  *G06F 1/3221* (2019.01)
  *G06F 1/3234* (2019.01)
  *G06F 3/06* (2006.01)

(52) U.S. Cl.
  CPC ........ *G06F 3/0625* (2013.01); *G06F 11/1076* (2013.01); *G06F 12/0873* (2013.01); *G06F 3/0689* (2013.01); *G06F 2212/1016* (2013.01); *G06F 2212/262* (2013.01); *G06F 2212/284* (2013.01); *Y02D 10/126* (2018.01); *Y02D 10/154* (2018.01)

(56) References Cited

U.S. PATENT DOCUMENTS

| | | | |
|---|---|---|---|
| 7,536,490 | B2 | 5/2009 | Mao |
| 8,347,010 | B1 | 1/2013 | Radovanovic |
| 8,429,436 | B2 | 4/2013 | Fillingim et al. |
| 8,582,448 | B2 | 11/2013 | Khatri et al. |
| 8,656,088 | B2 | 2/2014 | Belluomini et al. |
| 2002/0152355 | A1 | 10/2002 | Otterness et al. |
| 2004/0064752 | A1 | 4/2004 | Kazachinsky et al. |
| 2004/0122938 | A1 | 6/2004 | Messick et al. |
| 2005/0099766 | A1 | 5/2005 | Fraley et al. |
| 2008/0228959 | A1 | 9/2008 | Wang |
| 2008/0263246 | A1 | 10/2008 | Larson et al. |
| 2009/0164812 | A1* | 6/2009 | Capps, Jr. ............ G06F 1/3203 713/320 |
| 2010/0125695 | A1 | 5/2010 | Wu et al. |
| 2010/0274953 | A1 | 10/2010 | Lee et al. |
| 2012/0066439 | A1 | 3/2012 | Fillingim |
| 2012/0314763 | A1 | 12/2012 | Kuhtz |
| 2012/0331207 | A1 | 12/2012 | Lassa et al. |
| 2013/0007489 | A1 | 1/2013 | Unnikrishnan et al. |
| 2013/0318278 | A1 | 11/2013 | Wu |
| 2014/0006675 | A1 | 1/2014 | Meir |
| 2014/0013070 | A1 | 1/2014 | Toronyi et al. |
| 2014/0056316 | A1 | 2/2014 | Ling et al. |
| 2016/0077571 | A1 | 3/2016 | Sagar et al. |

OTHER PUBLICATIONS

Intel Corporation, "Intel Gigabit CT Desktop Adapter Benefits and Support Overview," (Research Paper), Aug. 10, 2008, 2 pages, available at http://www.intel.com/content/www/us/en/network-adapters/gigabit-network-adapters/gigabit-ct-desktop-adapter.html.
International Search Report & Written Opinion received in PCT Application No. PCT/US2014/036036, dated Jan. 28, 2015, 10 pages.
International Search Report & Written Opinion received in PCT Application No. PCT/US2014/054110, dated Apr. 28, 2015, 13 pages.
Kennedy, P., "LSI SAS 2308 RAID Controller—HBA information and Listing," (Web Page), May 30, 2012, 7 pages, available at http://www.servethehome.com/lsi-sas-2308-raid-controller-hba-information-listing/.
Intel Corporation, "Intel® EP80579 Integrated Processor with Intel® QuickAssist Technology Development Kit," Oct. 2008, User's Guide, <http://static6.arrow.com/aropdfconversion/479f609ceadeb4c986a3c1cb7e271c7369f91185/320067.pdf>.
Berktold et al., "CPU Monitoring With DTS/PECI," Sep. 2010, <https://www.intel.com/content/dam/www/public/us/en/documents/white-papers/cpu-monitoring-dts-peci-paper.pdf>.
Intel Corporation, "Techniques for Lowering Power Consumption in Design Utilizing the Intel® EP80579 Integrated Processor Product Line," Application Note, Feb. 2010, <https://www.intel.com/content/dam/www/public/us/en/documents/application-notes/techniques-lowering-power-ep80579-note.pdf>.
Intel Corporation, "Utilizing IEEE 1588 with Intel® EP80579 Integrated Processor Product Line," Application Note, May 2009, <https://www.intel.in/content/www/in/en/intelligent-systems/tolapai/utilizing-ieee-1588-ep80579-note.html>.
Seagate Technology LLC, "Cheetah 15K.6 FC," Product Manual, 100465943, Rev. A, Oct. 2007, <https://www.seagate.com/staticfiles/support/disc/manuals/enterprise/cheetah/15K.6/FC/100465943a.pdf>.

* cited by examiner

400

500

STORAGE SYSTEM BANDWIDTH DETERMINATION

BACKGROUND

Power consumption in computer systems has gained increased visibility in recent years due to the mobile market demanding lower power solutions for battery-based products. This visibility has spilled over into the enterprise arena, with demands for lower power and thus lower cost of ownership driving purchasing decisions. In general, it may be beneficial to reduce power consumption in the managing and storing of data, and in the provision of access to networks, servers, files, data, and so forth.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure provides techniques for reducing power consumption of a storage controller by reducing the clock frequency of storage controller components with minimal, if any, performance reduction. Storage controllers for disk subsystems are built to handle a variety of configurations, from a single storage drive to hundreds of storage drives in a RAID-6 configuration performing caching. In many cases, the storage controller has significantly more processing power than the underlying storage configuration can use. The present disclosure provides techniques for detecting storage configurations that will not use the full memory capabilities of the storage controller and reducing the memory frequency so that power consumption of the storage controller can be reduced with little, if any, reduction in performance.

Figure 1:
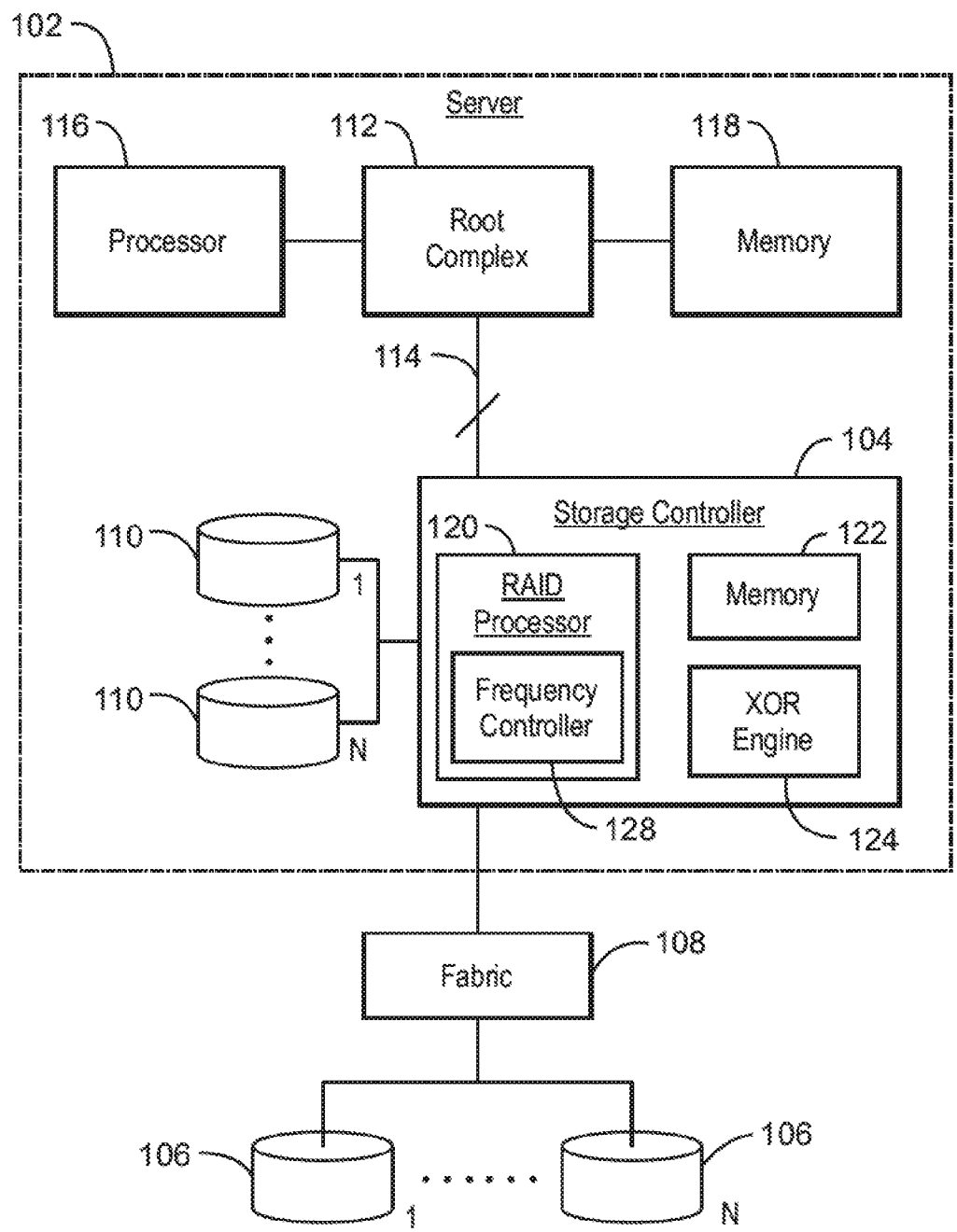
FIG. 1 is a block diagram of an example of a storage system with storage controller memory throttling.

FIG. 1 is a block diagram of an example of a storage system with storage controller memory throttling. The storage system 100 includes a host or server 102 with a storage controller 104 communicatively coupled to an array of storage drives 106 through a storage fabric 108. In certain examples, such as with storage systems 100 accommodating a RAID configuration and capability, or other configurations, the server 102 may be more commonly referred to as a host.

One or more storage drives 110 may be coupled to the storage controller 104. The attached storage drives 110 may be internal or external to the server 102. The storage drives 106 and 110 may be disk drives, hard disk drives (HDD), solid state drives (SSD), and so on. The storage drives 106 and 110 and the storage fabric 108 may be characterized as a back end of the storage system. A variety of protocols may be employed in the storage fabric 108. Moreover, a storage controller 104 may use the same or different protocols for back-end communication and for front-end communication. In certain examples, PCIe is used on the front end and SAS, SATA, or PCIe used on the back end. Other enterprise storage controllers may use fibre channel (FC) on the front end and SATA on back end, for example. Of course, many other configurations and topologies are applicable. The storage system 100 may be associated with data storage services, a data center, cloud storage, a distributed system, storage area network (SAN), virtualization, and so on. Again, however, the storage system 100 may be for data storage with the storage controller as a RAID controller or host bus adapter (HBA), for example, and the front end as PCIe or similar protocol, for instance, and the back end as SAS, SATA, or PCIe, and so on.

In the illustrated example for the front end, the storage controller 104 is coupled to a host component (e.g., root complex 112) of the server 102 via a bus or serial interconnect having lanes 114. In certain examples, PCIe technology is used. Other technologies such as Ethernet or InfiniBand, and so on, may be employed in lieu of or in addition to PCIe bus. A processor 116 (e.g., a CPU) and a memory 118 may be operationally coupled to the root complex 112. The storage controller 104 may have a RAID processor 120, memory 122, and an XOR engine 124. The memory 118 and memory 122 may include nonvolatile and/or volatile memory. Storage commands received by the storage controller 104 from the host are referred to herein as storage requests and include read requests and write requests.

The RAID processor 120 processes storage requests received from the root complex 112 and distributes data to the drives 106 or 110 in accordance with a specified RAID level. The RAID processor 120 may be implemented as an Application Specific Integrated Circuit (ASIC), Field Programmable Gate Array (FPGA), or other type of microprocessor including multiple-core processors. Various RAID configurations may involve operations such as data striping and error protection such as parity and data mirroring. The memory 122 is used by the RAID processor 120 to store intermediate data that is being prepared for storage to the drives 106 or 110. The XOR engine 124 is a processor that used to compute a parity bit for RAID configurations that use parity. The number of operations in memory 122 used to generate the parity bit is referred to herein by the variable "X". X will vary depending on the type of XOR engine 124 used in a particular implementation. In the simplest case of two XOR inputs, the number of memory transactions X is always equal to three (copy two arguments into the XOR and copy one result out of the XOR). In a more complex scenario with three or more inputs, X depends on how many inputs the XOR engine can handle at one time.

The memory 122 may also be used for data caching. Data caching generally enables data that is used more often to be stored in a faster memory. In some examples, data caching can be implemented using a separate memory device. Data caching can be implemented using any suitable memory type, such as a battery-backed Dynamic Random Access Memory (DRAM) and non-volatile memory types such as memristor memory, phase-change memory, and others. Caching on the storage system can be handled by the RAID processor 120. The RAID processor 120 is shown in FIG. 1 as residing on the storage controller 104, in which case, the caching operations performed by the RAID controller 120 may be transparent to the host systems. However, other configurations are possible. For example, the RAID processor may be implemented as instructions executed by the processor 116 out of the host memory 118.

Upon the receipt of a write request, the data can be temporarily stored to the cache memory 122 rather than the storage drives 106 or 110. Any subsequent accesses to the data can be processed through the cache memory 122 without accessing the storage drives 106. Stored data can also be moved from the storage drives 106 to the cache memory 122 in anticipation of future accesses from the host system. The data can be written out to the storage drives 106 and removed from the cache memory 122 according to a caching algorithm. Both write requests and read requests can be processed using the cache memory 122.

To determine the effectiveness of the data caching, various statistical data about the data caching process can be computed. The statistical data can be computed by a caching analytics engine running, for example, in the RAID processor 120. The RAID processor 120 can determine various caching percentages, including write-hit percentage, write-miss percentage, skip-cache write percentage, read-hit percentage, read-miss percentage, skip-cache read percentage, and extra read penalty percentage. A cache "miss" indicates that the relevant data was not found in the cache, resulting in a storage drive access. A cache "hit" indicates that the relevant data was found in the cache, thus avoiding storage drive access. A skip-cache write occurs when a write operation is configured to be processed directly to storage drives without attempting to access the cache. Similarly a skip-cache read occurs when a read operation is configured to be processed directly from the storage drives without attempting to access the cache. Skip-cache reads and skip-cache writes can occur as a result of the reads or writes being designated by the host as skip-cache, or as a result of the caching algorithm used by the RAID processor 120. One example of an extra read penalty is a read-ahead penalty. In some cases, after receiving a series of read requests, the RAID processor 120 may load subsequent sequential blocks of data from storage into the cache in anticipation of future read requests. A read-ahead penalty occurs when the data read into cache in anticipation of future read requests is not requested. The various caching percentages provide data about past data caching performance, which can be used to as an estimate for current or future caching performance.

The RAID processor 120 can include a frequency controller 128, which controls the clock frequency of the memory 122. The frequency controller 128 includes hardware or a combination of hardware and software. For example, the frequency controller 128 may be implemented as computer code stored within the RAID processor 120 as firmware or software loaded from another memory component. In some examples, the frequency controller 128 can be implemented in a separate processor. Reducing the clock frequency of the memory 122 reduces the power consumption of the storage controller 104. To reduce power consumption without sacrificing performance, the frequency controller 120 can reduce the clock frequency of the memory 122 to a level that provides as much bandwidth as the storage controller can use. The clock frequency that provides just enough bandwidth for the storage controller will be referred to herein as the target memory frequency.

To determine the target memory frequency, the frequency controller 128 can first determine whether the front-end bandwidth or the back-end bandwidth is the limiting factor. The front-end bandwidth is the bandwidth of the communications between the storage controller 104 and the root complex 112. The front-end bandwidth can be determined based on the bus technology used and the number of communication lanes between the storage controller 104 and the root complex 112. In the case of PCIe, the front-end bandwidth can be determined from the PCIe generation and the number of PCIe lanes. For example, if the storage controller 104 has 8 Gen3 PCIe lanes, each lane will have a bandwidth 1 Gigabyte per second, for a total front-end bandwidth of 8 Gigabytes per second.

The back-end bandwidth is the total drive bandwidth for all of the attached storage drives. For example, if there are 4 drives with bandwidth of 400 Megabytes per second each, the total back-end bandwidth is 1.6 Gigabytes per second. The bandwidth of each drive can be determined during a bandwidth test, as described further below in relation to FIG. 2.

The front-end bandwidth and the back-end bandwidth are each separately converted to a target memory bandwidth that reflects the processing demands placed on the memory 122. The larger of the two target memory bandwidths are used to determine the target memory frequency. The number of memory operations for each storage request from the host will vary based on a number of factors, including RAID level and the caching statistics. To determine an accurate prediction of the processing demands placed on the memory 122, the two target memory bandwidths are computed based on the RAID level and caching statistics.

It will be appreciated that the storage system 100 shown in FIG. 1 is only one example of a storage system in accordance with embodiments. In an actual implementation, the storage system 100 may include various additional storage devices and networks, which may be interconnected in various fashions, depending on the design considerations of a particular implementation. A large storage system will often include many more storage arrays and servers 102 than depicted in FIG. 1. Further, the storage system 100 may provide data services to client computers, for example.

Additionally, examples of the storage system 100 may include only a single drive (or only a single drive mounted or in service) such as either only one drive 106 or one drive 110. These examples of a storage system 100 with only a single disk may be implemented in a RAID-0 (no redundancy) configuration, for instance. Such examples of a single-disk storage system may be applied depending on particular factors.

Furthermore, examples of the storage system 100 may apply to a zero drive case. In other words, such examples of the storage system 100 do not have a storage drive (or do not have a storage drive mounted or in service). Thus, these examples of a storage system 100 may have N=0 storage drives 106 (associated with the storage fabric) and N=0 direct attached drives 110. Such may exist during system maintenance or downtime, during active/passive fail-over scenarios including with external storage, and so forth.

Figure 2:
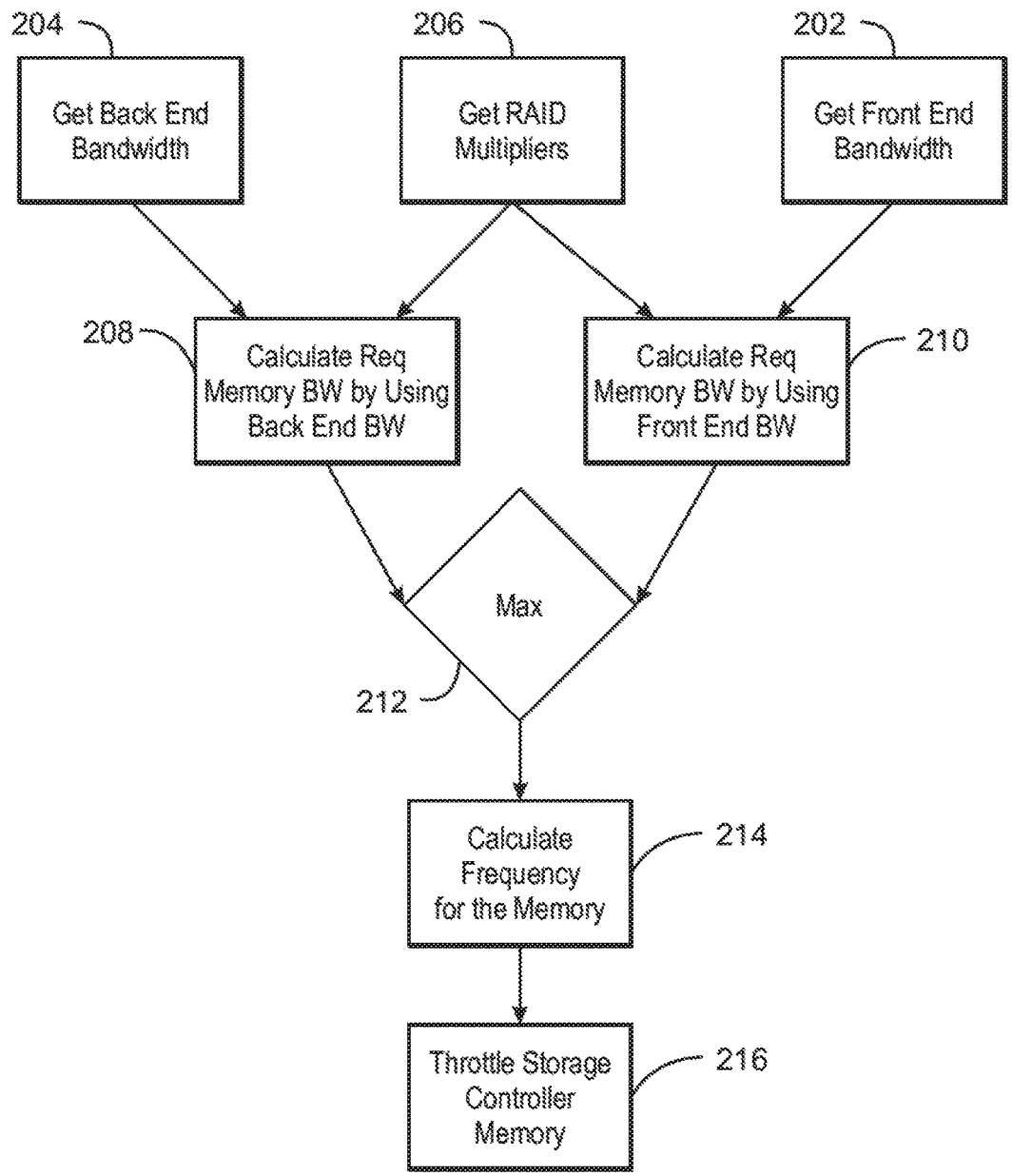
FIG. 2 is a process flow diagram of a method of throttling a storage controller memory.

FIG. 2 is a process flow diagram of a method of throttling a storage controller memory. The method may be performed by a processing device included in a storage controller, such as the RAID processor 120 of FIG. 1. The method may begin at block 202.

At block 202, the front-end bandwidth is determined. As explained above, the front-end bandwidth can be determined based on the bus technology used and the number of communication lanes between the storage controller 104 and the root complex 112. The bus technology provides an indication about the data rate provided by each lane. In some examples, the storage controller may be configured to negotiate both number of lanes and speed of the bus with its link partner. Accordingly, the front-end bandwidth may be different for different iterations of the method.

At block 204, the back-end bandwidth is determined. The back-end bandwidth can be determined may by performing bandwidth tests on the storage drives 106 or 110. Bandwidth tests may be performed upon insertion of a new drive (e.g., a new drive 106 or 110) and repeated occasionally according to a schedule or administrator instructions. The bandwidth test may perform sequential reads on the inserted drive and measure or calculate the bandwidth of the drive during this test. In some examples, bandwidth tests may be performed for various types of storage operations such as sequential writes, sequential reads, random writes, and random reads Typically, there is a ramp-up time for drive accesses. Thus, the determined bandwidth may be based on a steady state condition occurring after an initial inconsistent ramp period. The bandwidth data collected or calculated during a steady state condition may be used as the measured bandwidth data for the basis of the bandwidth requirement determination of the drive 106 or 110. At the conclusion of the bandwidth test, the bandwidth information may be stored and associated with the tested drive for future reference. The bandwidth values may be stored in and retrieved from any suitable memory such as memory 122 or a storage drive 106 or 110. The total back-end bandwidth may be computed by summing the individual bandwidth values determined for each of the attached drives.

At block 206, RAID multipliers are obtained. The RAID multipliers are factors that are used to determine bandwidth multipliers for various types of storage operations such as full stripe writes, full stripe reads, partial stripe writes, and partial stripe reads. Full stripe operations are operations that access every drive in a RAID set, where as partial stripe writes access only a subset of drives. Full stripe operations can be achieved in multiple ways such as a read/write request that is very large and spans all drives in the RAID set. Another way to achieve a full stripe operation is to combine several smaller read/write requests that have been received in a sequential fashion into a full stripe operation. Stripe sizes are generally configured such that full stripe operations result in drive accesses that appear sequential, and partial stripe accesses tend to result in drive accesses that appear random. The bandwidth multipliers are used to scale the back-end and/or front-end bandwidths acquired at blocks 202 and 204 to the target memory bandwidth for the cache based on current RAID configuration and current caching statistics. The RAID multipliers are determined based on the RAID configuration, and separate RAID multipliers may be obtained for cache hits, cache misses, and skip-cache operations, and extra-read penalties. The RAID multipliers may be determined based on the knowledge of the storage controller and how the storage controller processes storage requests for different RAID configurations and cache results. In some examples, the RAID multipliers may be stored in a lookup table included in or accessible to the storage controller. The RAID multipliers and bandwidth multipliers are described further in relation to FIG. 3.

At block 208, the target back-end memory bandwidth is computed using the back-end bandwidth from block 204 and the RAID multipliers from block 206. At block 210, the target front-end memory bandwidth is computed using the front-end bandwidth from block 202 and the RAID multipliers from block 206. The computations performed at blocks 208 and 210 are described further in relation to FIG. 3.

At block 212, the target back-end memory bandwidth and the target front-end memory bandwidth are compared to determine which bandwidth is larger. The larger of the two bandwidths is passed to the operations performed block 214.

At block 214, the clock frequency of the storage controller memory is computed based on the target bandwidth for the memory received from block 212, also referred to herein as the target memory bandwidth. In some examples, the clock frequency of the storage controller memory is throttled to provide a processing speed equal to the target memory bandwidth. For example, if the target memory bandwidth has been determined to be 1 Gigabyte per second, the clock frequency of the storage controller memory can be throttled to provide 1 Gigabyte per second processing speed. In some examples, a performance margin is applied so that the clock frequency of the storage controller memory provides a processing speed slightly greater than the target memory bandwidth, for example, 2, 5, 10, or 25 percent greater.

At block 216, the memory is throttled to the target memory bandwidth for the cache by setting the clock frequency to the frequency computed at block 214. The method 200 may be repeated to ensure that the memory frequency is suitably adjusted in response to changing conditions of the computing device. For example, the method 200 may be repeated periodically, or according to a schedule, or in response to an event such as a user input or a change in a monitored condition of the computing device, among others.

Figure 3:
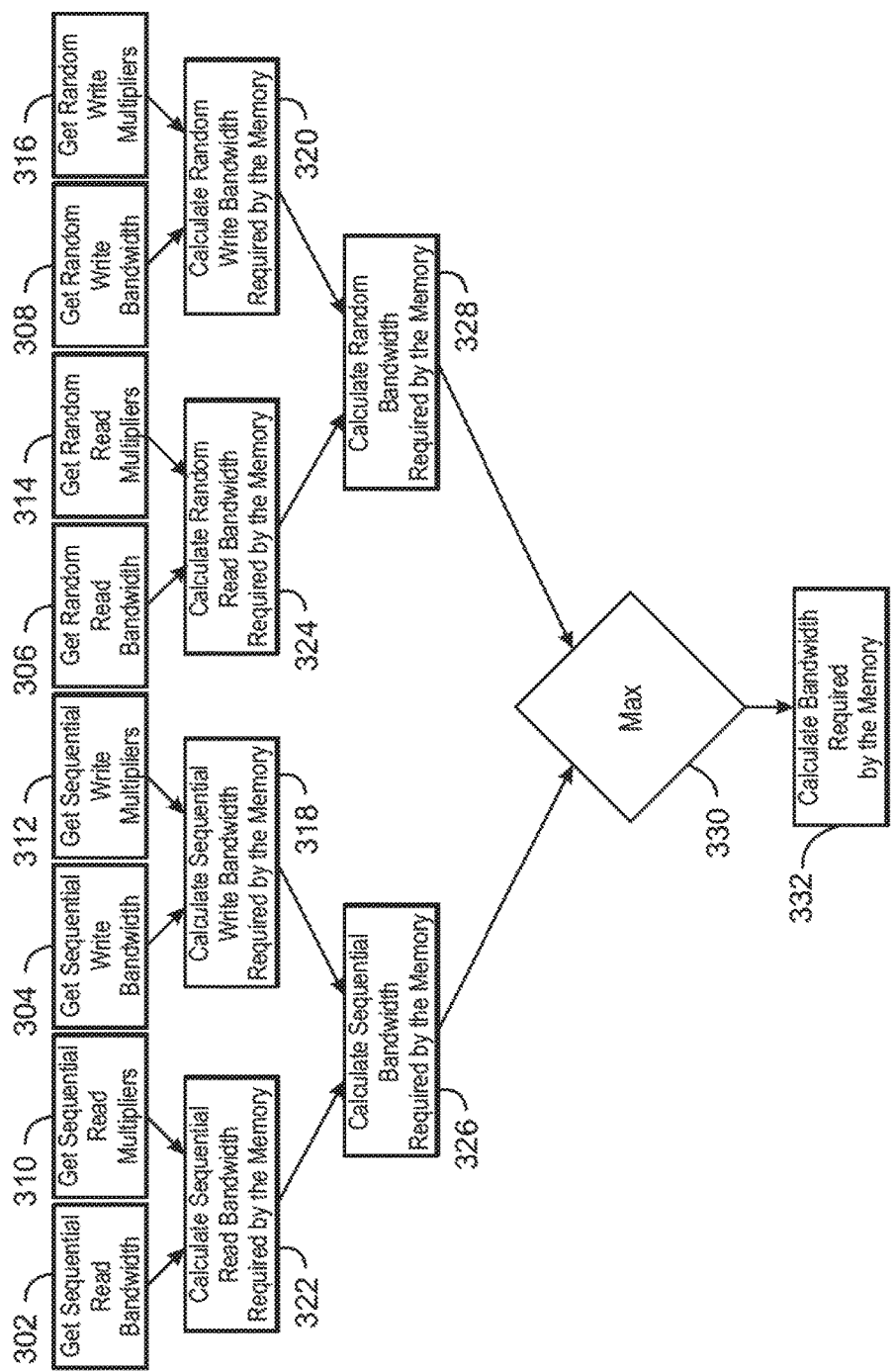
FIG. 3 is a process flow diagram of a method of computing a target memory bandwidth using RAID multipliers, caching statistics, and a front-end or back-end bandwidth.

FIG. 3 is a process flow diagram of a method of computing a target memory bandwidth using RAID multipliers, caching statistics, and a front-end or back-end bandwidth. The method 300 is performed at blocks 208 and 210 of FIG. 2, once for the front-end bandwidth and once for the back-end bandwidth. The term "front-end iteration" is used to describe the method as it would be applied for the front-end bandwidth. The term "back-end iteration" is used to describe the method as it would be applied for the back-end bandwidth. The computations performed in method 300 are to determine the target memory bandwidth based on the average number of memory transactions used for each type storage transaction. The number of memory transactions used for each storage transaction will be affected by the RAID configuration and current caching statistics. In the following blocks, bandwidth multipliers are computed for various types of storage operations based on RAID configuration and current caching statistics.

At blocks 302, 304, 306 and 308, bandwidths are obtained. Block 302 refers to the sequential read bandwidth, block 304 refers to the sequential write bandwidth, block 306 refers to the random read bandwidth, and block 308 refers to the random write bandwidth. As used herein, a sequential read or write is a storage operation that creates a full stripe and results in sequential drive operations, and a random read or write is a storage operation that creates a partial stripe and results in random drive operations. Those familiar with the art will recognize that full stripe operations that result in sequential drive operations may or may not actually be sequential and the same thing for random operations. Sequential storage operations generally use fewer memory transactions than random storage operations.

During the back-end iteration, the bandwidths obtained at blocks 302-308 will be the back-end bandwidths measured at block 204 of FIG. 2. The back-end bandwidths for each block may vary depending on the type of storage operation. Each of the bandwidths can be measured in a separate bandwidth test. In some examples, a single bandwidth test is performed for one of the storage operation types, and the remaining bandwidths are estimated. For example, the bandwidth test can be performed for a sequential read, and the remaining bandwidths can be estimated based on the sequential read bandwidth, depending on the type of storage devices used in a particular implementation. For hard disks, the sequential write bandwidth can be estimated to be approximately equal to the sequential read bandwidth, and the random read and random write bandwidths can be estimated to be larger than the sequential read bandwidth by a suitable factor, such as 2, 3, 4 or more. During the front-end iteration, the bandwidths obtained at blocks 302-308 will all be the same and will be equal to the front-end bandwidth obtained at block 202 of FIG. 1.

At blocks 310, 312, 314 and 316, the RAID multipliers are obtained. Various RAID multipliers are obtained based on the RAID configuration. As described further below, separate RAID multipliers may be obtained for write hits, write misses, skip-cache writes, read hits, read misses, skip-cache reads, and extra-read penalties. The RAID multipliers may be determined based on the knowledge of the storage controller and how the storage controller processes storage requests for different RAID configurations and cache results. In some examples, the RAID multipliers may be stored in a lookup table included in or accessible to the storage controller. One example of a technique for determining the RAID multipliers is described in relation to FIG. 4.

At block 318, the cache bandwidth required for sequential writes is computed. To compute the cache bandwidth required for sequential writes, a bandwidth multiplier for memory writes is determined, based on the RAID multipliers obtained at block 312 and current caching statistics. The current caching statistics can include write hit percentage, skip-cache write percentage, and write miss percentage. Any suitable technique can be used to obtain the current caching statistics.

When the caching statistics and RAID multipliers are obtained, the number of memory transactions per write request can be calculated according to equation 1, below.

$$\text{\# of memory transactions per Write request} = ((\text{hit \%})*\text{RAID multiplier } A) + ((\text{skip \%})*\text{RAID multiplier } B)) + ((\text{miss \%})*\text{RAID multiplier } C)) \quad \text{Eq. 1}$$

In equation 1, RAID multiplier A equals the number of memory transactions per write request for a write hit, RAID multiplier B equals the number of memory transactions per write request for a skip-cache Write, and RAID multiplier C equals the number of memory transactions per write request for a write miss. In most cases, RAID multiplier A corresponding to write hits will generally be 1 regardless of RAID configuration. RAID multiplier B and RAID multiplier C will vary depending on the RAID configuration and other factors such as the components used to compute parity bits, as explained further below in relation to FIG. 4.

The number of drive transactions per write request can be calculated according to equation 2, below.

$$\text{\# of Drive transaction per Write Request} = ((\text{hit \%})*\text{RAID multiplier } D) + ((\text{skip \%})*\text{RAID multiplier } E)) + ((\text{miss \%})*\text{RAID multiplier } F)) \quad \text{Eq. 2}$$

In equation 2, RAID multiplier D equals the number of drive transactions per write request for a write hit, RAID multiplier E equals the number of drive transactions per write request for a skip-cache Write, and RAID multiplier F equals the number of drive transactions per write request for a write miss. In most cases, RAID multiplier D corresponding to write hits will generally be 1 regardless of RAID configuration. RAID multiplier E and RAID multiplier F will vary depending on the RAID configuration and other factors such as the components used to compute parity bits, as explained further below in relation to FIG. 4.

During the front-end iteration, the bandwidth multiplier is equal to the number of drive transactions per write. During the back-end iteration, the overall bandwidth multiplier for write requests can be calculated according to equation 3, below.

$$\text{BW multiplier for writes} = \text{\# of memory transactions per Drive transaction} = (\text{\# of memory transactions per Write})/(\text{\# of Drive transactions per Write}) \quad \text{Eq. 3}$$

The required bandwidth for sequential writes is computed by multiplying the sequential write bandwidth from block 304 by the bandwidth multiplier. This value is passed to block 326.

At block 320, the cache bandwidth required for random writes is computed. The cache bandwidth required for random writes will use the same equations described above in relation to block 318 using the set of RAID multipliers obtained at block 316 and the random write bandwidth obtained at block 308.

At block 322, the cache bandwidth required for sequential reads is computed. A bandwidth multiplier for memory reads is determined based on the RAID multipliers obtained at block 310 and caching statistics. The caching statistics used at block 216 can also be used at block 322. As explained above, separate RAID multipliers may be obtained for read hits, read misses, and skip-cache reads, and extra read penalty based on the knowledge of the storage controller and how the storage controller processes read requests for different RAID configurations and cache results. In some examples, the RAID multipliers for reads will be the same regardless of RAID configuration. Table 1 below provides an example of RAID multipliers that may be used to determine the bandwidth multiplier for reads. In some examples, the RAID multipliers may be stored in a lookup table included in or accessible to the storage controller.

TABLE 1

Example RAID multipliers for read requests.

| | RAID multipliers | |
| --- | --- | --- |
| | # of memory transactions | # of drive transactions |
| Read Hit | G = 1 | K = 1 |
| Skip-Cache Read | H = 0 | L = 1 |
| Read Miss | I = 2 | M = 1 |
| Extra Read Penalty | J = 1 | P = 1 |

The number of memory transactions per read request can be calculated according to equation 4, below.

$$\text{\# of memory transactions per Read} = ((\text{hit \%})*\text{RAID multiplier } G) + ((\text{skip \%})*\text{RAID multiplier } H)) + ((\text{miss \%})*\text{RAID multiplier } I)) + (\text{extra read \%}*\text{RAID multiplier } J) \quad \text{Eq. 4}$$

In equation 1, RAID multiplier G equals the number of memory transactions per read request for a read hit, RAID multiplier H equals the number of memory transactions for a skip-cache read, RAID multiplier I equals the number of memory transactions for a read miss, and RAID multiplier J equals the number of memory transactions for an extra read penalty. Examples of RAID multipliers that can be used in equation 4 are shown in Table 1.

The number of drive transactions per read can be calculated according to equation 5, below.

# of Drive transactions per Read=((hit %)*RAID
multiplier K)+((skip %)*(RAID multiplier L))+
((miss %)*(RAID multiplier M))+(extra read
%*RAID multiplier P)   Eq. 5

In equation 5, RAID multiplier K equals the number of drive transactions per read for a read hit, RAID multiplier L equals the number of drive transactions per read for a skip-cache read, and RAID multiplier M equals the number of drive transactions per read for a read miss, and RAID multiplier P equals the number of memory transactions per read for an extra read penalty. Examples of RAID multipliers that can be used in equation 5 are shown in Table 1.

The overall bandwidth multiplier for reads can be calculated according to equation 6, below.

BW multiplier for reads=# of memory transactions
per Drive transaction=(# of memory transactions per Read)/(# of Drive transactions per
Read)   Eq. 6

At block 324, the cache bandwidth required for random reads is computed. The cache bandwidth required for random reads will use the same equations described above in relation to block 322 using the set of RAID multipliers obtained at block 314 and the random read bandwidth obtained at block 306.

At block 326, the sequential read and sequential write bandwidths from blocks 318 and 322 are combined as a weighted average to get the bandwidth required by the cache for sequential operations, referred to herein as the sequential bandwidth. The sequential bandwidth can be calculated according to equation 7.

Sequential BW=((read %)*(sequential read bandwidth))+((write %)*(sequential write bandwidth))   Eq. 7

In Equation 7, the read percentage is the percentage of time that the storage controller is processing reads and the write percentage is the percentage of time that the storage controller is processing writes. The read percentage and the write percentage can be determined by monitoring.

At block 328, the random read and random write bandwidths from blocks 320 and 324 are combined as a weighted average to get the bandwidth required by the cache for random operations, referred to herein as the random bandwidth. The random bandwidth can be calculated according to equation 8.

random BW=((read %)*(random read bandwidth))+((write %)*(random write bandwidth))   Eq. 8

At block 212, a determination is made regarding whether the sequential bandwidth or random bandwidth is greater. The greater of the two bandwidths is kept and sent to block 332.

At block 332, the bandwidth received from block 212 is used as the bandwidth required by the cache. During the front-end iteration, the bandwidth received from block 212 is used as the target front-end memory bandwidth. During the back-end iteration, the bandwidth received from block 212 is used as the target back-end memory bandwidth.

Figure 4:
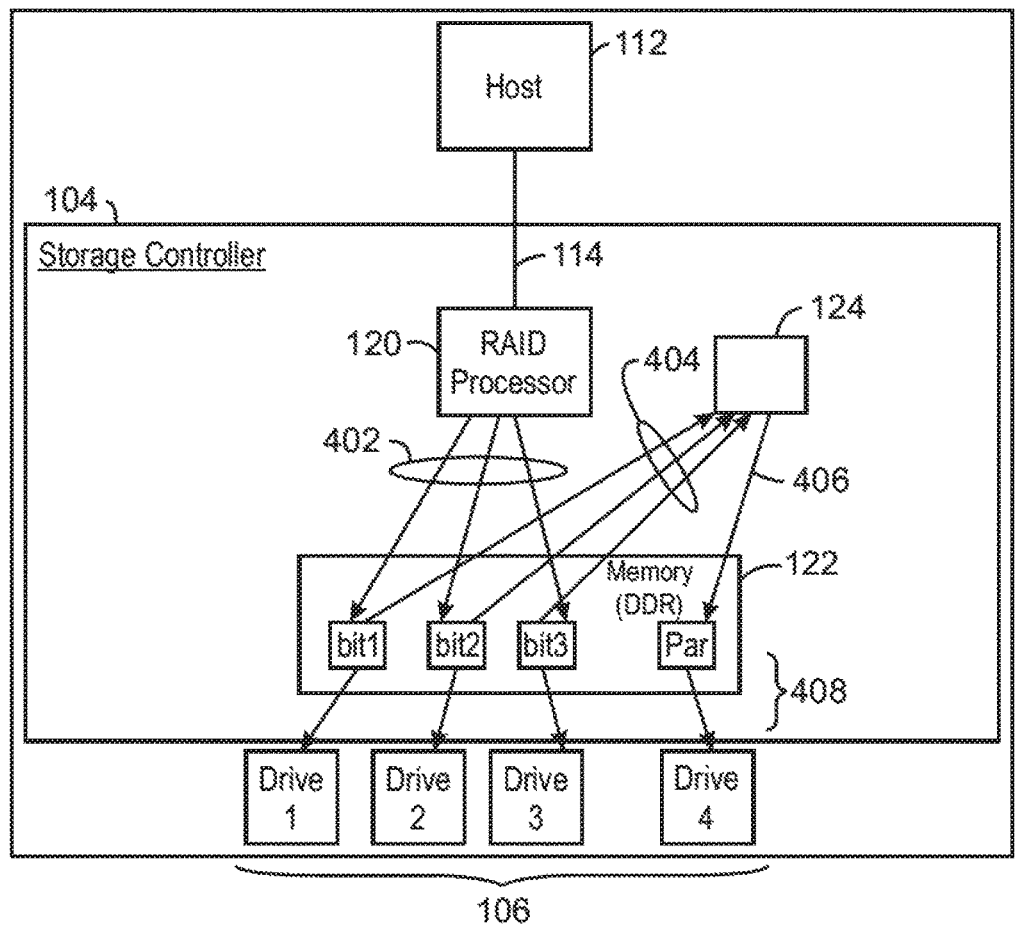
FIG. 4 is an illustration of an example technique for determining RAID multipliers.

FIG. 4 is an illustration of an example technique for determining RAID multipliers. The simplified example show in FIG. 4 explains how to determine RAID multiplier C and RAID multiplier F of equations 1 and 2 in the case of a sequential write miss for a RAID 5 configuration. As mentioned above, RAID multiplier C equals the number of memory transactions per write for a write miss, and RAID multiplier F equals the number of drive transactions per write for a write miss. RAID multiplier C and RAID multiplier F will vary depending on the RAID configuration and other factors such as the components used to compute parity bits.

Raid 5 involves block-level striping across with distributed parity to a drive. The example of FIG. 4, shows block-level striping across three drives with distributed parity to a forth drive. Upon receiving a write request from the host and determining that the target information is not in the cache, the RAID processor sends the data to the memory in three memory transactions 402. To compute the parity bit, the memory sends the data to the XOR engine in three memory transactions 404. The XOR engine then uses X memory transactions to computes the parity bit and sends the parity bit to the parity drive. The value X varies depending on the configuration of the XOR engine. Once the parity bit is received, four memory transactions 408 are used to send the data to the four drives. The process described above results in 7+X memory transactions for every four drive transactions. Accordingly, for this example, RAID multiplier C=7+X, and RAID multiplier F=4. Similar analysis can be used to determine the RAID multipliers B, C, E, and F for any RAID configuration, number of drives, XOR engine type, and any other factor that might affect the RAID multipliers.

Figure 5:
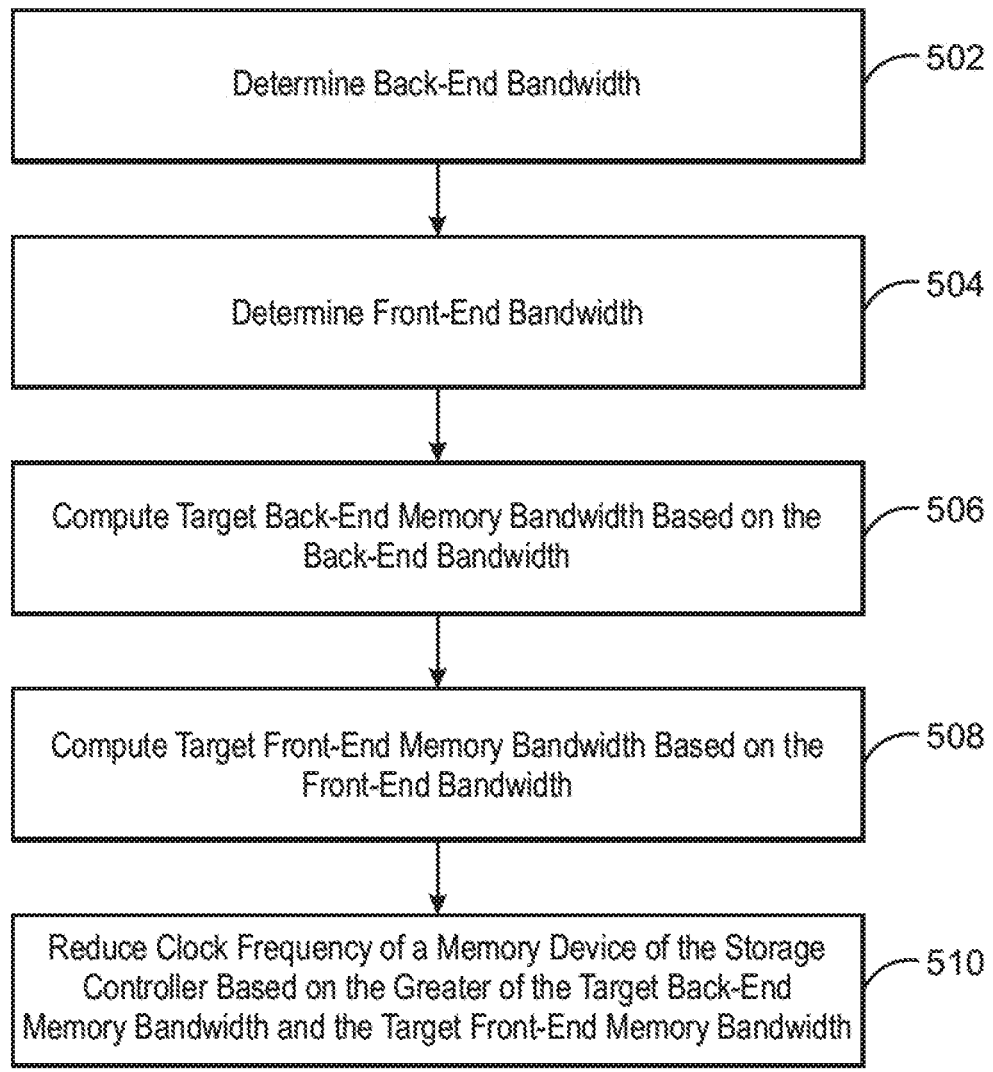
FIG. 5 is a process flow diagram summarizing a method of throttling a storage controller memory.

FIG. 5 is a process flow diagram summarizing a method of throttling the clock frequency of a storage controller memory. The method can be performed by a processor such as the RAID processor 120 or the processor 116, for example. Additionally, the method may be performed in a storage system, wherein the back-end of the storage system includes a storage drive communicatively coupled to a storage controller, and the front-end of the storage system includes a front-end bus coupling the storage controller to a host.

At block 502 a back-end bandwidth of the storage system is determined. For example, the back-end bandwidth can be measured as described above.

At block 504, a front-end bandwidth of the storage system is determined. For example, the front-end bandwidth can be based on the type of front end bus technology and number of lanes.

At block 506, a target back-end memory bandwidth is computed based on the back-end bandwidth. Computing the target back-end memory bandwidth can include multiplying the back-end bandwidth by a bandwidth multiplier, which is computing based on caching statistics recorded for the storage system during the processing of recent storage requests and based on a set of RAID multipliers determined according to how the storage controller processes storage requests for different RAID configurations and cache results.

At block 508, a target front-end memory bandwidth is computed based on the front-end bandwidth. Computing the target front-end memory bandwidth can include multiplying the front-end bandwidth by a bandwidth multiplier, which is computing based on caching statistics recorded for the storage system during the processing of recent storage requests and based on a set of RAID multipliers determined according to how the storage controller processes storage requests for different RAID configurations and cache results.

At block 510, the clock frequency of a memory device of the storage controller is reduced based on the greater of the target back-end memory bandwidth and the target front-end memory bandwidth.

Figure 6:
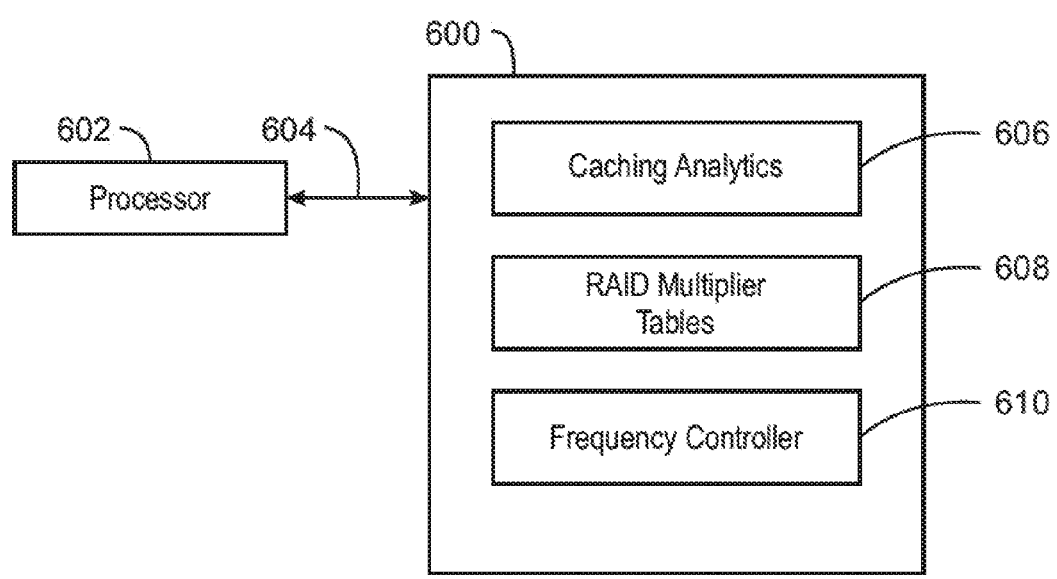
FIG. 6 is a block diagram showing a tangible, non-transitory, computer-readable medium that stores code configured to operate a data storage system.

FIG. 6 is a block diagram showing a tangible, non-transitory, computer-readable medium that stores code configured to operate a data storage system. The computer-readable medium is referred to by the reference number 600.

The computer-readable medium 600 can include RAM, a hard disk drive, an array of hard disk drives, an optical drive, an array of optical drives, a non-volatile memory, a flash drive, a digital versatile disk (DVD), or a compact disk (CD), among others. The computer-readable medium 600 may be accessed by a processor 602 over a computer bus 604. Furthermore, the computer-readable medium 600 may include code configured to perform the methods described herein. The computer readable medium 600 may be a memory device included in or accessible to a storage controller. For examples, the computer readable medium 600 may include firmware that is executed by a storage controller such as the storage controller 104 of FIG. 1.

The various software components discussed herein may be stored on the computer-readable medium 600. A portion 606 of the computer-readable medium 600 can include a cache analytics engine configured to provide caching statistics, which can be used to help determine a required memory bandwidth for a storage controller. A portion 608 can include one or more tables of RAID multipliers, which are determined according to how the storage controller processes storage requests for different RAID configurations and cache results. A portion 610 can include a frequency controller configured to reduce a memory bandwidth of the storage controller based, at least in part, on the caching statistics, the RAID configuration of the storage system, and the front-end and back-end bandwidths of the storage controller. Other methods discussed above may be accommodated with software modules (executable code) stored on portions of the computer readable medium 600. Although shown as contiguous blocks, the software components can be stored in any order or configuration. For example, if the tangible, non-transitory, computer-readable medium is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method comprising:
    determining, via a processor, a back-end bandwidth of a storage system, wherein the back-end of the storage system comprises a storage drive communicatively coupled to a storage controller;
    determining, via a processor, a front-end bandwidth of the storage system, wherein a front-end of the storage system comprises a front-end bus coupling the storage controller to a host;
    computing a target back-end memory bandwidth based on the back-end bandwidth, comprising:
        computing a bandwidth multiplier based on caching statistics recorded for the storage system during the processing of storage requests; and
        multiplying the back-end bandwidth by the bandwidth multiplier;
    computing a target front-end memory bandwidth based on the front-end bandwidth; and
    reducing power consumption of the storage controller by reducing a clock frequency of a memory device of the storage controller based on the greater of the target back-end memory bandwidth and the target front-end memory bandwidth.

2. The method of claim 1, wherein the bandwidth multiplier is further based on a set of RAID multipliers determined according to how the storage controller processes storage requests for different RAID configurations and cache results.

3. The method of claim 1, wherein computing the target back-end memory bandwidth comprises:
    computing a sequential bandwidth for sequential storage operations;
    computing a random bandwidth for random storage operations; and
    basing the target back-end memory bandwidth on the larger of the sequential bandwidth and the random bandwidth.

4. The method of claim 3, wherein computing the sequential bandwidth comprises:
    computing a sequential read bandwidth;
    computing a sequential write bandwidth; and
    combining the sequential read bandwidth and sequential write bandwidth as a weighted average weighted according to a percentage of time that the storage controller is processing reads and a percentage of time that the storage controller is processing writes.

5. The method of claim 3, wherein the determined back-end bandwidth of the storage system is one of a sequential read bandwidth and a sequential write bandwidth, and the sequential bandwidth for sequential storage operations is computed based on the determined back-end bandwidth of the storage system.

6. The method of claim 3, wherein the determined back-end bandwidth of the storage system is one of a random read bandwidth and a random write bandwidth, and the random bandwidth for random storage operations is computed based on the determined back-end bandwidth of the storage system.

7. The method of claim 4, wherein computing the random bandwidth comprises:
    computing a random read bandwidth;
    computing a random write bandwidth; and
    combining the random read bandwidth and random write bandwidth as a weighted average.

8. A storage system comprising:
    a storage controller;
    a back end that comprises a storage drive communicatively coupled to the storage controller;
    a front end comprising a front-end bus communicatively coupled to the storage controller; and
    a non-transitory computer-readable medium comprising instructions executable by the storage controller to:
        determine a back-end bandwidth of the storage system;
        determine a front-end bandwidth of the storage system;
        compute a target back-end memory bandwidth based on the back-end bandwidth, including instructions to:
            compute a bandwidth multiplier based on caching statistics recorded for the storage system during the processing of storage requests; and
            multiply the back-end bandwidth by the bandwidth multiplier;
        compute a target front-end memory bandwidth based on the front-end bandwidth; and
        reduce a clock frequency of a memory device of the storage controller based on the greater of the target back-end memory bandwidth and the target front-end memory bandwidth.

9. The storage system of claim 8, wherein the bandwidth multiplier is further based on a set of RAID multipliers determined according to how the storage controller processes storage requests for different RAID configurations and cache results.

10. The storage system of claim 8, wherein, the instructions are executable by the storage controller to:
compute a sequential bandwidth for sequential storage operations;
compute a random bandwidth for random storage operations; and
base the target back-end memory bandwidth on the larger of the sequential bandwidth and the random bandwidth.

11. The method of claim 10, wherein, to compute the sequential bandwidth, the instructions are executable by the storage controller to:
compute a sequential read bandwidth;
compute a sequential write bandwidth; and
combine the sequential read bandwidth and sequential write bandwidth as a weighted average weighted according to a percentage of time that the storage controller is processing reads and a percentage of time that the storage controller is processing writes.

12. The storage system of claim 10, wherein the determined back-end bandwidth of the storage system is one of a sequential read bandwidth and a sequential write bandwidth, and the instructions are executable by the storage controller to compute the sequential bandwidth for sequential storage operations based on the determined back-end bandwidth of the storage system.

13. The storage system of claim 10, wherein the determined back-end bandwidth of the storage system is one of a random read bandwidth and a random write bandwidth, and the instructions are executable by the storage controller to compute the random bandwidth for random storage operations based on the determined back-end bandwidth of the storage system.

14. The storage system of claim 11, wherein, to compute the random bandwidth, the instructions are executable by the storage controller to:
compute a random read bandwidth;
compute a random write bandwidth; and
combine the random read bandwidth and random write bandwidth as a weighted average.

15. A tangible, non-transitory, computer-readable medium comprising instructions executable by a processor to:
determine a back-end bandwidth of the storage system;
determine a front-end bandwidth of the storage system;
compute a target back-end memory bandwidth based on the back-end bandwidth, including instructions to:
compute a bandwidth multiplier based on caching statistics recorded for the storage system during the processing of storage requests; and
multiply the back-end bandwidth by the bandwidth multiplier;
compute a target front-end memory bandwidth based on the front-end bandwidth; and
reduce a clock frequency of a memory device of the storage controller based on the greater of the target back-end memory bandwidth and the target front-end memory bandwidth.

16. The computer-readable medium of claim 15, wherein the bandwidth multiplier is further based on a set of RAID multipliers determined according to how the storage controller processes storage requests for different RAID configurations and cache results.

17. The computer-readable medium of claim 15, wherein the instructions are executable by the processor to:
compute a sequential bandwidth for sequential storage operations;
compute a random bandwidth for random storage operations; and
compute the target back-end memory bandwidth based on the larger of the sequential bandwidth and the random bandwidth.

18. The computer-readable medium of claim 17, wherein the instructions are executable by the processor to:
compute a sequential read bandwidth;
compute a sequential write bandwidth; and
combine the sequential read bandwidth and sequential write bandwidth as a weighted average weighted according to a percentage of time that the storage controller is processing reads and a percentage of time that the storage controller is processing writes.

19. The computer-readable medium of claim 17, wherein:
the determined back-end bandwidth of the storage system is one of a sequential read bandwidth and a sequential write bandwidth, and the sequential bandwidth for sequential storage operations is computed based on the determined back-end bandwidth of the storage system; or
the determined back-end bandwidth of the storage system is one of a random read bandwidth and a random write bandwidth, and the random bandwidth for random storage operations is computed based on the determined back-end bandwidth of the storage system.

20. The computer-readable medium of claim 18, wherein, to compute the random bandwidth, the instructions are executable by the processor to:
compute a random read bandwidth;
compute a random write bandwidth; and
combine the random read bandwidth and random write bandwidth as a weighted average.

* * * * *